United States Patent [19]

van der Lely

[11] 4,254,609
[45] Mar. 10, 1981

[54] MACHINES FOR WORKING MOWN CROP

[76] Inventor: Cornelis van der Lely, 7, Brüschenrain, Zug, Switzerland

[21] Appl. No.: 943,194

[22] Filed: Sep. 18, 1978

[30] Foreign Application Priority Data

Sep. 23, 1977 [NL] Netherlands .................. 7710410

[51] Int. Cl.³ ............................................ A01D 77/00
[52] U.S. Cl. ........................................ 56/370; 56/365
[58] Field of Search .................. 56/370, 371, DIG. 1, 56/14.3, 14.4, 14.5, 14.6, 502, 503, 504, 365, 372, 128, 255, 500, 501, 395

[56] References Cited

U.S. PATENT DOCUMENTS

| | | | |
|---|---|---|---|
| 1,662,160 | 3/1928 | Myrick | 56/395 |
| 1,683,183 | 9/1928 | Herr | 56/128 |
| 2,347,664 | 5/1944 | Chilton | 56/DIG. 1 |
| 2,631,418 | 3/1953 | Ronning | 56/502 |
| 2,675,665 | 4/1954 | Tintes et al. | 56/372 |
| 2,843,990 | 7/1958 | Coultas | 56/DIG. 1 |
| 2,899,795 | 8/1959 | Cunningham | 56/370 |
| 2,974,467 | 3/1961 | Long | 56/128 |
| 3,006,133 | 10/1961 | van der Lely et al. | 56/370 |
| 3,156,245 | 11/1964 | Hobbs | 56/14.6 |
| 3,340,247 | 3/1966 | Lautzenheiser | 156/107 |
| 3,343,355 | 9/1967 | Freelander | 56/295 |
| 3,474,602 | 10/1969 | Molzahn | 56/14.4 |
| 3,676,988 | 7/1972 | Hauser-Lienhard | 56/371 |
| 3,699,755 | 10/1972 | Hauser | 56/DIG. 1 |
| 4,035,992 | 7/1977 | Moosbrucker et al. | 56/DIG. 1 |
| 4,055,037 | 10/1977 | Oosterling | 56/DIG. 1 |
| 4,062,173 | 12/1977 | Mulder | 56/370 |

Primary Examiner—Paul J. Hirsch
Attorney, Agent, or Firm—Mason, Mason and Albright

[57] ABSTRACT

An agricultural implement for carding, combing and/or teasing crop lying on the ground by receiving same from the ground by comb-like structures and then engaging and conveying the crop through the implement by a rotating drum with tines extending therefrom or rotating discs which have substantially vertical axes, the crop being restrained as it is engaged to impart somewhat of a combing action. In embodiments having a rotary drum with tines which rotates about a horizontal axis, further rotating tines in the path of the conveyed crop tend to comb and disentangle the crop further. The latter such tines may be close to or actually within the cylinder of rotation traced by tines extending from the drum although direct contact between the two sets of rotating tines is avoided. The combing action may be accomplished by a series of parallel plates or non-moving resilient tines or both and the position of the tines may be adjustable and, in one case, teeth depend from the tines to provide the combing action, such tines being freely movable within limits. With the discs or rake wheels, the rotation of same is such as to deliver crop to the rear whereas the drum rotates in the direction of travel as seen from the side. In the embodiment having the rotatable discs or rake wheels, the restraining member is mounted on a parallelogram arrangement and its disposition within such arrangement is adjustable within limits from a vertical disposition to an inclined disposition.

28 Claims, 8 Drawing Figures

MACHINES FOR WORKING MOWN CROP

SUMMARY OF THE INVENTION

This invention relates to machines for working mown crop, such machines being of the kind which comprise at least one crop conveyor having at least one crop engaging member that, during operation, displaces crop from a receiving area of the machine to a delivery area thereof.

According to one aspect of the invention, there is provided a machine of the kind set forth, wherein at least one crop restraining member extends throughout not less than half of the working width of the machine at a location between said receiving and delivery areas, the crop restraining member or members being flexible and arranged to co-operate with the crop engaging member or members, during the use of the machine, in such a way that a carding, combing and/or teasing action is performed upon crop worked by the machine.

For a better understanding of the invention, and to show how the same may be carried into effect, reference will now be made, by way of example, to the accompanying drawings, in which:

DESCRIPTION OF THE PREFERRED EMBODIMENTS

Figure 1:
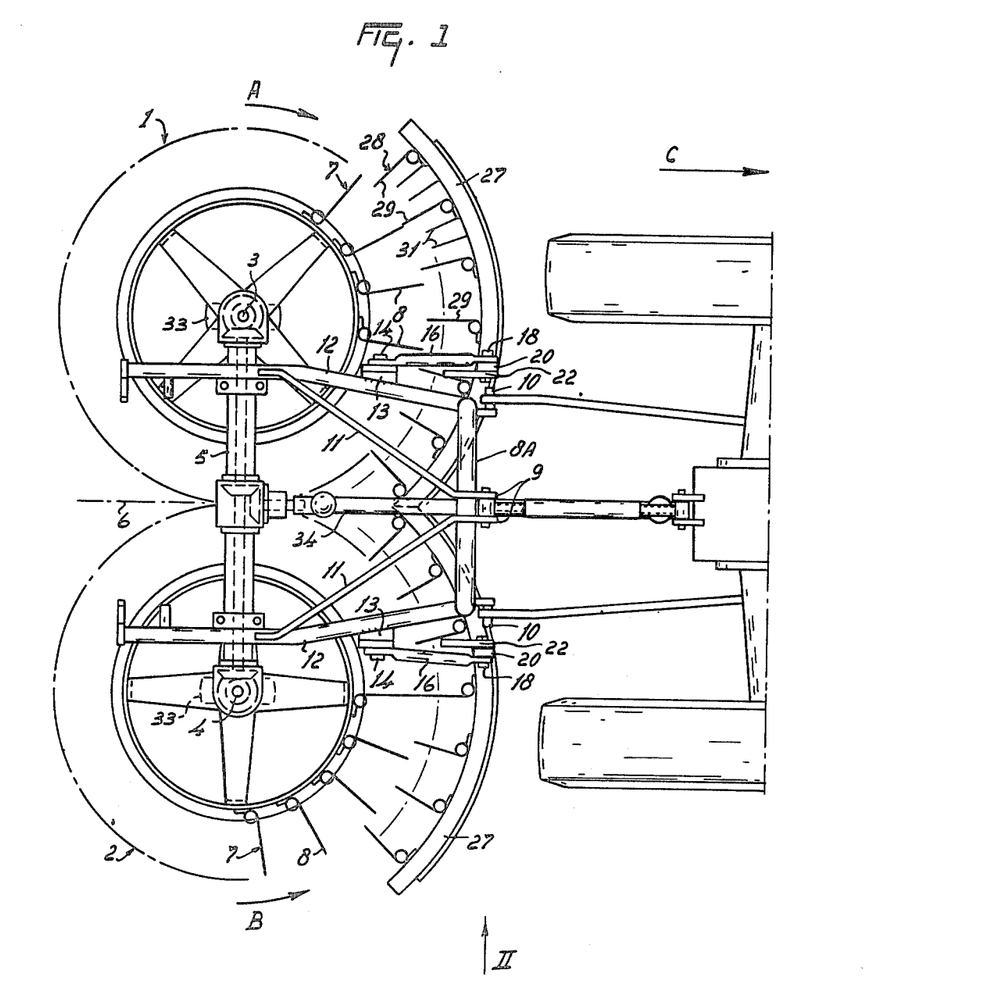
FIG. 1 is a plan view of a haymaking machine in accordance with the invention connected to the rear of an agricultural tractor.
Figure 2:
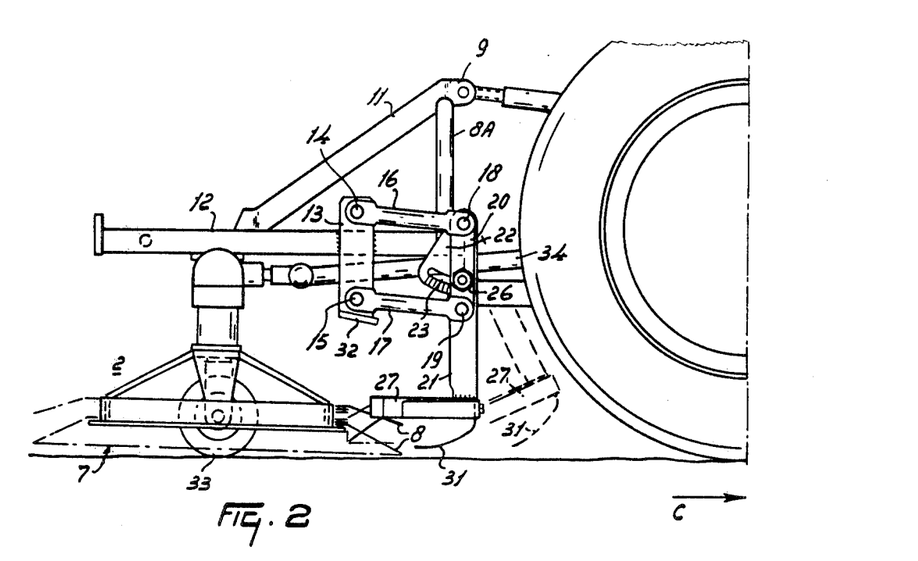
FIG. 2 is a side elevation as seen in the direction indicated by an arrow II in FIG. 1.
Figure 3:
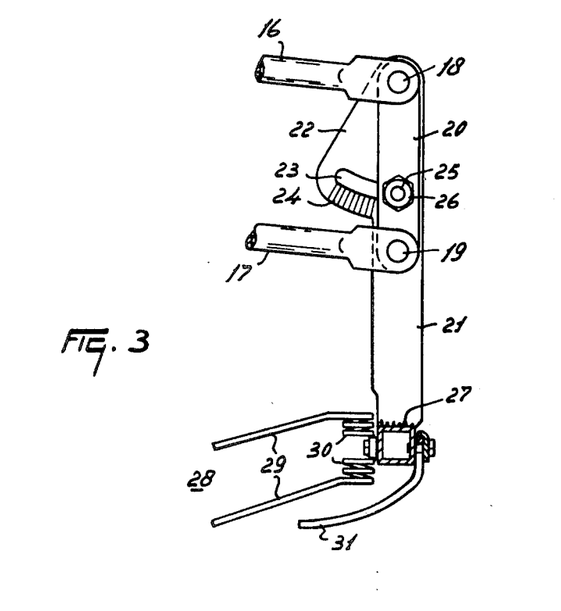
FIG. 3 illustrates parts that can be seen in FIG. 2 to an enlarged scale and in greater detail with some of them in cross-section.

Referring to FIGS. 1 to 3 of the accompanying drawings the machine for working mown crop which is lying upon the ground that is illustrated therein is a haymaking machine which comprises two crop conveyors in the form of corresponding rotary rake members 1 and 2. The two rake members 1 and 2 are arranged in side-by-side relationship in a direction that is substantially horizontally transverse, and usually (as illustrated) substantially perpendicular, to the intended direction of operative travel of the machine that is indicated by an arrow C in FIGS. 1 and 2 of the drawings, the two rake members 1 and 2 being arranged to revolve, during operation, in the opposite directions A and B, respectively, which are denoted by arrows in FIG. 1. The axes of rotation of the two rake members 1 and 2 are the upwardly extending and substantially vertical axes of corresponding central shafts 3 and 4 but it is noted that, although usually substantially vertical disposed, said axes of rotation are not strictly vertical, the upper ends of the shafts 3 and 4 being a little farther advanced with respect to the direction C than are the lower ends thereof. This will be apparent from a study of FIG. 2 of the drawings. The two shafts 3 and 4 are rotatably supported from gear boxes which are carried at the opposite ends of a hollow frame beam 5 which extends substantially horizontally perpendicular to the direction C. The machine is constructed in a substantially symmetrical manner with respect to a vertical plane 6 (FIG. 1) which is parallel to the direction C. Each of the two rake members 1 and 2 is provided with crop engaging members in the form of a large number of tine groups 7, each tine group 7 comprising two tines 8 that are substantially vertically spaced apart from one another in directions which are substantially parallel to the axes of rotation of the two rake members 1 and 2, the two tines 8 of each group 7 being directed substantially radially outwards as seen in FIG. 1 of the drawings but actually being inclined obliquely downwardly towards the ground surface as seen in FIG. 2. FIG. 1 of the drawings illustrates, in broken lines, circles that indicate the paths which are traced by the outermost ends of the tines 8 which correspond to each of the two rake members 1 and 2 during operative rotation of those rake members and it will be noted that said circles just intersect at a location which coincides with the aforementioned vertical plane of substantial symmetry 6. This arrangement is not essential and, as an alternative, the machine may be constructed so that said circles are spaced apart from one another by a short distance in the region of the plane 6 or in such a way that said circles overlap one another in the region of the plane 6. In the latter case, the drive transmission to the two rake members 1 and 2 should be arranged in such a way that the tine groups 7 of the two members 1 and 2 "intermesh" in the region of overlap thus avoiding any significant fouling of one rake member by the other and vice versa.

The hollow frame beam 5 is rigidly connected to a coupling member or trestle 8A of the machine which coupling member or trestle 8A is basically of substantially inverted U-shaped configuration. The top of the coupling member or trestle 8A is provided with a coupling point in the form of a pair of forwardly projecting and apertured lugs 9, said lugs being arranged for pivotal connection, in a manner that is known per se and that is illustrated somewhat diagrammatically in FIGS. 1 and 2 of the drawings, to the free end of the upper adjustable-length lifting link of a three-point lifting device or hitch at the rear of an agricultural tractor or some other vehicle which moves and operates the machine during its use. Two lower coupling points in the form of substantially horizontally aligned pins 10 are provided close to the lower ends of the limbs of the coupling member or trestle 8A, the two pins 10 projecting laterally with respect to the direction C from the opposite outer sides of said two limbs. The two lower coupling points that are afforded by the pins 10 are arranged for pivotal connection to the free ends of the two lower lifting links of the same three-point lifting device or hitch, the upper link of which co-operates with the lugs 9. The two lugs 9 are preferably (as illustrated), but not essentially, integral with corresponding strips 11 which strips diverge downwardly and rearwardly with respect to the direction C from the top of the coupling member or trestle 8A to have their lowermost and rearmost ends rigidly secured to the tops of two supporting beams 12 at locations which are nearly, but not exactly, in vertical register with the hollow frame beam 5 that lies immediately beneath the supporting beams 12 and that is rigidly but releasably secured to those beams by fastening plates and co-operating bolts.

It will be seen from FIG. 1 of the drawings that the positions at which the supporting beams 12 are fastened to the hollow frame beam 5 are close to the gear boxes at the opposite ends of the beam 5. When the machine is in operation, a plane which contains the longitudinal axes or centerlines of the two supporting beams 12 is horizontally or substantially horizontally disposed.

The leading ends of the two supporting beams 12 are rigidly secured to the upright limbs of the coupling member or trestle 8A at locations which are spaced by short distances from the lowermost extremities of those limbs. The portions of the two supporting beams 12 that are secured to the underlying hollow frame beam 5 are in parallel relationship with one another and with the direction C but it will be seen from FIG. 1 of the drawings that, a little in front of said beam 5 and of the connections of the two strips 11 to the supporting beams 12, said beams 12 are bent angularly towards one another by a few degrees so as to form portions that are forwardly convergent with respect to the direction C, the coupling member or trestle 8A rigidly interconnecting the leading ends of these forwardly convergent portions. The two supporting beams 12 rigidly carry, at symmetrically identical locations which are spaced rearwardly from the coupling member or trestle 8A, two supports 13 which both project upwardly above, and downwardly beneath, the corresponding supporting beams 12, the extent of upward projection thereabove being significantly less than the extent of the downward projection therebeneath (see FIG. 2). The upper and lower ends of the substantially vertically extending supports 13 carry corresponding upper and lower pivots 14 and 15 which pivots define corresponding upper and lower axes that are parallel to one another and perpendicular or substantially perpendicular to the direction C. Forwardly projecting upper links 16 have their rear ends turnably mounted on the upper pivots 14 and, similarly, forwardly projecting lower links 17 have their rear ends turnably mounted on the lower pivots 15. The links 16 and 17 are parallel to one another and are freely turnable relative to the supports 13 about the corresponding pivots 14 and 15. As seen in FIG. 1 of the drawings, the links 16 and 17 are located at the relatively remote outer sides of the frame structure which comprises the supporting beams 12 and the coupling member or trestle 8A. As seen in side elevation (FIG. 2), the leading ends of the four upper and lower links 16 and 17 are just in advance of the coupling member or trestle 8A with respect to the direction C.

The leading ends of the four links 16 and 17, with respect to the direction C, are connected, in a freely turnable manner, to the upper and lower ends of corresponding carrier brackets 20 by respective upper and lower pivots 18 and 19 which define axes that are parallel to those defined by the aforementioned upper and lower pivots 14 and 15. The two carrier brackets 20 are both substantially vertically disposed when the machine is in use. The axes which are defined by the four pairs of pivots 14, 15, 18 and 19 are all substantially horizontally transverse, and usually (as illustrated) substantially perpendicular, to the direction C and are located at the four corners of a freely pivotable dual parallelogram linkage, the links 16 and 17 being of equal effective lengths and the distance between the pivots 14 and 15 being equal to the distance between the pivots 18 and 19. The two parts of the dual parallelogram linkage arm symmetrically arranged at opposite sides of the plane 6. Each upper pivot 18 has the upper end of a corresponding carrier arm 21 mounted thereon in a freely turnable manner and in such a position that, when the parts of the machine occupy the positions that are shown in full lines in FIGS. 1 to 3 of the drawings, the carrier arms 21 lie closely alongside the carrier brackets 20. An upper end region of each carrier arm 21 is provided with a rearwardly directed sector-shaped projection 22 in which is formed an arcuately curved slot 23, the center of curvature of said slot 23 being coincident with the axis that is defined by the upper pivots 18. The projections 22 are of embossed formation and that region of each projection 22 which lies between the radially outer edge of the corresponding slot 23 and the neighboring radially outer edge of the projection 22 itself is formed with a plurality of radially extending (with respect to the pivots 18) teeth 24, said teeth 24 thus being disposed in corresponding curved rows. Each carrier bracket 20 is formed with a hole which is at the same distance from the respective upper pivot 18 as is the corresponding slot 23 said hole registering with that slot 23. A clamping bolt 25 is entered through each slot 23 and through the hole in the corresponding carrier bracket 20 and each bolt 25 is furnished with a nut 26 that preferably, but not essentially, is of a known kind which incorporates an insert designed to prevent the nut 26 from working loose as a result of the vibration to which it is subjected during the operation of the machine. It will be noted that the bolts 25 are arranged with their heads at the sides of the projections 22 which are remote from the neighboring carrier brackets 20, the co-operating nuts 26 being disposed alongside the relatively remote outer surfaces of the two brackets 20. Preferably, but not absolutely essentially, the sides of the two carrier brackets 20 which face the immediately neighboring carrier arms 21 are formed with teeth or the like which can co-operate retainingly with the teeth 24 and it will be apparent that, after temporarily loosening the clamping bolts 25, the carrier arms 21 can be turned upwardly and forwardly with respect to the direction C about the upper pivots 18 from the positions thereof that are illustrated in full lines in the drawings to any chosen ones of large numbers of alternative positions that are limited by the angular extents of the slots 23 and by the numbers and arrangements of the teeth 24 and the co-operating teeth or the like (if provided) on the carrier brackets 20. One such alternative position is shown in broken lines in FIG. 2 of the drawings. It is only necessary to re-tighten the bolts 25 to maintain the chosen alternative positions of the carrier arms 21 as long as may be required. Thus, each carrier arm 21 may occupy not only the substantially vertically disposed position that is illustrated in full lines in the drawings, but can alternatively be maintained in any chosen one of a large number of positions in which it extends obliquely downwardly and forwardly with respect to the direction C from its uppermost end. The carrier brackets 20 always remain vertically or substantially vertically disposed.

The carrier arms 21 project downwardly beneath the lower pivots 19 and thus downwardly beyond the lower ends of the carrier brackets 20, the lowermost extremity of each carrier arm 21 being welded or otherwise rigidly secured to a corresponding one of two arcuately curved tubular supports 27 that are both of hollow formation and each of which may conveniently have the square cross-section that can be seen in FIG. 3 of the drawings. In the full line position of the parts that is illustrated in the drawings, the lower surface of each curved support 27 is spaced above the ground surface when the machine is in operation and the center of curvature thereof is coincident, or substantially coincident with the longitudinal axis of the corresponding shaft 3 or 4 which axis, it will be remembered, is the axis of rotation of the rake member 1 or 2 concerned. The supports 27 are generally in advance of the corresponding rake members 1 and 2 with respect to the direction C and each of them is spaced from the circle which is traced by the tips of the tines 8 of that member 1 or 2 when the machine is in operation. The two supports 27 both extend to the vertical plane of substantial symmetry 6 of the machine and their ends are rigidly secured to one another at a location which substantially coincides with said plane. In the embodiment which is illustrated in the accompanying drawings, the two curved supports 27 together extend throughout substantially the whole of the combined working width of the two rake members 1 and 2 but it is noted that this is not essential and that said supports 27 may extend throughout a lesser proportion of the combined working width of the two rake members, it being necessary, however, that their combined extent should not be less than half the total working width of the two rake members 1 and 2.

The rearwardly facing, with respect to the direction C, concave sides of the curved supports 27 each have a plurality, such as seven, of crop restraining members in the form of groups 28 of tines 29 releasably fastened to them by bolts, each tine group 28 comprising two substantially vertically spaced apart upper and lower tines 29. The two tines 29 of each group 28 are formed integrally from a single length of resilient material, such as spring steel wire or rod, and it will be seen from FIGS. 1 and 3 of the drawings that substantially straight crop working portions of the two tines 29 of each group 28 are connected to a common fastening portion, which is releasably secured to the support 27 concerned, by corresponding helically wound coils 30 thus considerably increasing the effective resiliency of said crop working portions. When undeflected, the tines 29 project substantially radially inwards towards the corresponding shafts 3 and 4 from their supports 27 as seen in the plan view of FIG. 1 of the drawings but it can be seen in FIGS. 2 and 3 thereof that the substantially straight crop working portions of the tines 29 are inclined obliquely downwardly and rearwardly with respect to the direction C from their integral junctions with the coils 30. FIG. 1 also shows that the rearmost ends of the tines 29 are very closely spaced from, and almost coincide with, the circles that are traced by the outermost free ends or tips of the tines 8 which form parts of the rake members 1 and 2 when those rake members are rotating in the direction A and B. An alternative arrangement is possible in which the rearmost ends of the tines 29 penetrate radially inwardly of said circular paths as seen in FIG. 1 of the drawings. In fact, arrangements are possible in which the non-rotary tine groups 28 are so disposed that either the upper tines 8 or the lower tines 8 of each rotary tine group 7 of the corresponding rake member 1 or 2 move between the two tines 29 of said group 28 when the machine is in use. With the arrangement that is illustrated, the free ends or tips of the lower tines 29 of the non-rotary tine groups 28 are spaced by short distances from the ground surface when the machine is in use, said short distances advantageously being substantially half the vertical spacing between the free ends or tips of the upper and lower tines 8 of one of the rotary tine groups 7. With the arrangement that is shown in full lines in the drawings, the free ends of the upper tines 29 of the groups 28 that correspond to each support 27 are contained in a substantially horizontal plane which is spaced by a very short distance above a further substantially horizontal plane which contains the free ends or tips of the upper tines 8 of the rotary tine group 7 which correspond to the co-operating rake member 1 or 2.

The leading, with respect to the direction C, convex surface of each curved support 27 has a plurality of crop guides 31 releasably secured to it by bolts and clamping plates. The crop guides 31 may, as illustrated, be in the form of spring steel or other resilient or substantially rigid rods or may be in the form of strips which, once again, are preferably, but not essentially, of resilient formation. The front of each crop guide 31 with respect to the direction C is substantially vertically disposed (see FIG. 3), said front being firmly but releasably clamped to the curved support 27 concerned. However, immediately beneath its support 27, each crop guide 31 is bent downwardly and rearwardly with respect to the direction C to form a major curved portion, the convex side of which is directed downwardly. The rearmost end of each crop guide 31, with respect to the direction C, is horizontally or substantially horizontally disposed assuming that the carrier arms 21 are substantially vertically disposed as shown in full lines in the drawings. As seen in side elevation (FIG. 2) the two curved rows of crop guides 31 are located principally in advance, with respect to the direction C, of a vertical plane containing the longitudinal axes of the four pivots 14 and 15. As seen in the plan view of FIG. 1 of the drawings, the crop guides 31, like the non-rotary tine groups 28, are directed substantially radially inwardly towards the corresponding shafts 3 and 4 from their respective curved supports 27. The lowermost ends of the supports 13 carry oblique stops 32 that are arranged to co-operate with the lower links 17 of the dual parallelogram linkage in preventing that linkage from turning downwardly beyond a predetermined position. It will be realized that the stops 32 thus determine the minimum spacing of the tine groups 28 and guide rods 31 above the ground surface that is possible.

Freely rotatable but non-swivellable ground wheels 33 are mounted at the lowermost ends of the shafts 3 and 4 so as to lie centrally beneath the corresponding rake members 1 and 2, said ground wheels 33 thus supporting those rake members from the ground surface. As can be seen in FIG. 1 of the drawings, a rotary shaft extends axially through the hollow frame beam 5 which latter is provided, midway along its length, with a gear box. The axially extending shaft which has just been mentioned is provided, inside said gear box, with a bevel pinion having teeth which are in driven mesh with those of a further bevel pinion carried by a rotary input shaft of the machine that extends substantially horizontally parallel to the direction C and has a splined or otherwise keyed end which projects forwardly from the front of the central gear box. The opposite ends of the shaft which extends through the hollow frame beam 5 project into the aforementioned gear boxes which are carried at the corresponding ends of the beam 5 itself and bevel pinions which are diagrammatically illustrated in FIG. 1 of the drawings place said shaft in driving relationship with the two rake members 1 and 2. When the machine is in use, the forwardly projecting splined or otherwise keyed end of its rotary input shaft is placed in driven connection with the rear power take-off shaft of an agricultural tractor or other operating vehicle by way of an intermediate telescopic transmission shaft 34, which is of a construction that in known per se, having universal joints at its opposite ends. The parallel portions of the two supporting beams 12 project rearwardly of the hollow frame beam 5 by some distance and it will be seen from the drawings that these rearwardly projecting parts are provided with pivot shafts and support cradles for detachable swath boards or other crop guide members (not shown). The swath boards or other crop guide members may be used to enable the machine to form hay or other crop into a swath or windrow and it is possible for them to be tilted forwardly and upwardly, without actually detaching them from the remainder of the machine, to positions where they will not influence hay or other crop displaced by the rake members 1 and 2. The haymaking machine will then function as a tedder and it is noted that means (not shown) is preferably provided to enable the angle of attack of the tine groups 7 of the two rake members 1 and 2 to be adjusted having regard to whether the machine is to function as a tedder or is to be used for the formation of swaths or windrows.

In the use of the haymaking machine that has been described with reference to FIGS. 1 to 3 of the drawings, the lugs 9 and pins 10 are employed to connect the frame structure to the three-point lifting device or hitch of an agricultural tractor or other operating vehicle and the rear power take-off shaft of the same tractor or other vehicle is placed in driven connection with the rotary input shaft of the central gear box by way of the known telescopic transmission shaft 34 that has universal joints at its opposite ends. As the machine is moved fowardly over mown hay or other crop that is to be treated thereby, the crop conveyors that are afforded by the rake members 1 and 2 are caused to rotate in the opposite directions A and B and, due to the slight inclination of the shafts 3 and 4 to the vertical, the crop engaging members that are afforded by the groups 7 of the tines 8 engage and pick up the lying hay or other crop principally, but not exclusively, in leading regions of the two members 1 and 2 with respect to the direction C. It frequently occurs that the stalks of the hay or other mown crop that is lying upon the ground are already, or become, quite badly tangled so that, in many known machines, part of the displaced hay or other crop is left upon the ground, behind the machine, in the form of "knots" or "balls". This has the disadvantage that both the natural drying of the crop and its eventual collection and transport to a storage location are adversely affected. The crop restraining members that are afforded by the groups 28 of the non-rotary tines 29, and the crop guides 31, are provided to minimize "knotting" or "balling" or both of the hay or other crop as much as possible.

The hay or other crop that is engaged by the tine groups 7 is displaced in constantly varying directions which are the resultants of the rotation of the rake members 1 and 2 in the directions A and B and the movement of the whole machine in the direction C but the result is that the engaged hay or other crop is moved from the areas at which it is picked up or received towards the plane 6. The lying hay or other crop which is approached by the rake members 1 and 2 first passes through the spaces beneath or between the crop guides 31 or both and, due to the configuration of those crop guides, much of the crop that is disposed in the receiving areas of the machine is pressed downwardly towards the ground surface and is temporarily maintained in engagement with that surface by the guides 31 which slide forwardly over the crop. As the hay or other crop is released from the rearmost free ends of the guides 31, it is again engaged and pressed temporarily against the ground surface by the resiliently mounted crop working portions of the lower tines 29. Thus both the tine groups 28 and the crop guides 31 act as crop restraining members. As the hay or other crop is released rearwardly from the lower tines 29, it is engaged by the closely adjacent or overlapping tines 8 which latter are of course, quite rapidly rotating. The tines 8 co-operate with the restraining tines 29 and crop guides 31 in picking up the crop with a carding, combing and/or teasing action so that any existing crop entanglements are substantially carded out or combed with the result that many of the crop stalks reach the plane 6 in a separate and untangled condition, any remaining entanglements that reach the plane 6 being principally in the form of small tufts of crop which, with the separate stalks, can either be spread (tedded) throughout at least the working width of the machine or can be formed into a swath or windrow by the aforementioned swath boards or other crop guide members which have been mentioned above but that are not illustrated in FIGS. 1 to 3 of the drawings. If the machine should encounter a thick layer of mown hay or other crop, the crop guides 31 will be subjected to an upwardly directed displacing force because of the disposition of the surfaces of those guides which actually contact the crop. It will be remembered that the dual parallelogram linkage is of freely pivotable formation so that, when the upwardly displacing force that acts upon the crop guides 31 is of sufficient magnitude, those guides, together with the supports 27, tine groups 28 and carrier arms 21, are moved upwardly without being tilted. The tine groups 28 and crop guides 31 are thus movable upwardly and downwardly to match the thickness of the layers of crop with which the machine has to cope and, incidentally, to match any undulations in the surface of the ground that may be encountered. Under some operating conditions, particularly when very thick layers of crop are to be dealt with, it is desirable to loosen the bolts 25 and to turn the carrier arms 21, with the supports 27, in a counter clockwise direction (as seen in FIGS. 2 and 3 of the drawings) until a new position, such as the one that is shown in broken lines in FIG. 2 of the drawings, is attained. This new position is retained as long as may be required merely by re-tightening the bolts 25 thus pressing the teeth 24 of the projections 22 into engagement with the neighboring surfaces of the untilted carrier brackets 20 which surfaces, it will be remembered, may be provided with teeth or the like to co-operate with the teeth 24. In, for example, the position that is shown in broken lines in FIG. 2 of the drawings, the crop guides 31 and crop restraining tines 29 are more steeply inclined to the ground surface and can thus press hay or other crop which they encounter more firmly against that surface so that a larger quantity of crop can be effectively maintained in position per unit time than is possible when the full line position that is shown in FIGS. 1 to 3 of the drawings is adopted. The tines 29 are steeply inclined downwardly towards the rotary crop engaging tines 8 and, with this arrangement even upper portions of thick layers of crop are engaged and displaced by the rake members 1 and 2 with a thorough carding, combing and/or teasing action. If the hay or other crop is to be effectively carded or combed, it is necessary, as mentioned above, that the curved supports 27, the groups 28 of crop restraining tines 29 and the crop guides 31 should have an effective width which is not less than half the total working width of the machine. It is noted that the curved supports 27 which are at the front of the machine with respect to the direction C act as protective shields for the rake members 1 and 2.

Figure 4:
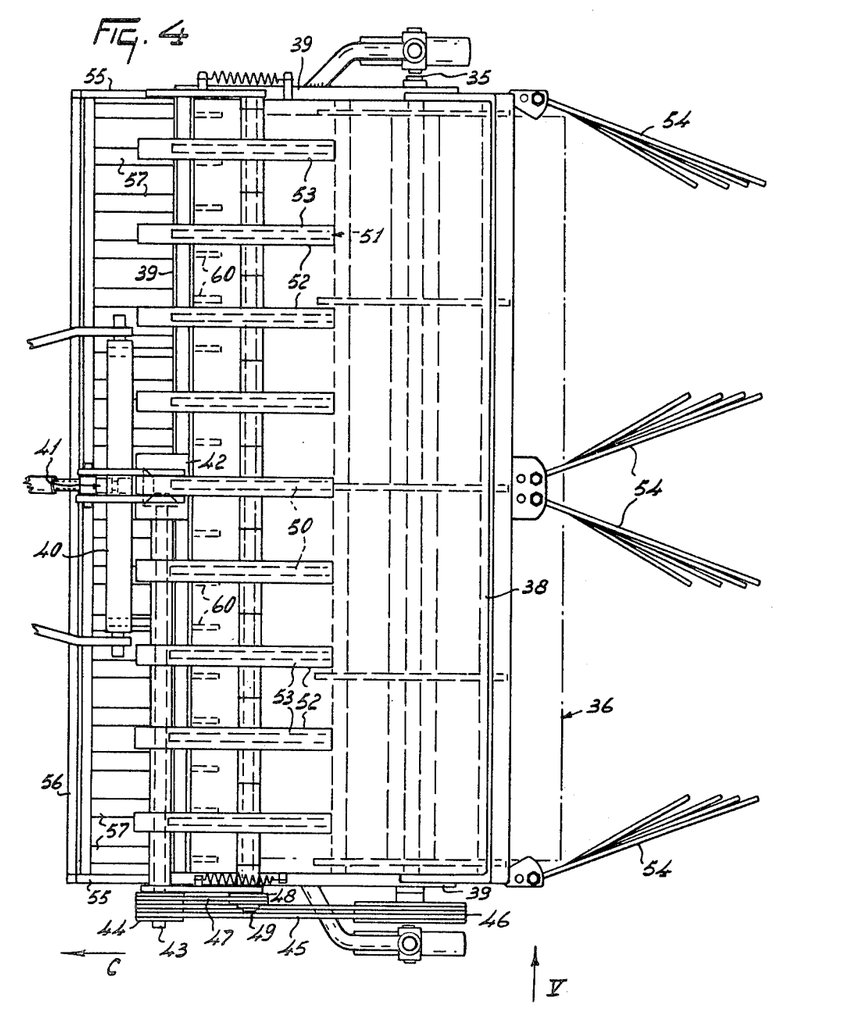
FIG. 4 is a plan view of a drum tedder in accordance with the invention connected to the rear of an agricultural tractor or other operating vehicle (not shown)
Figure 5:
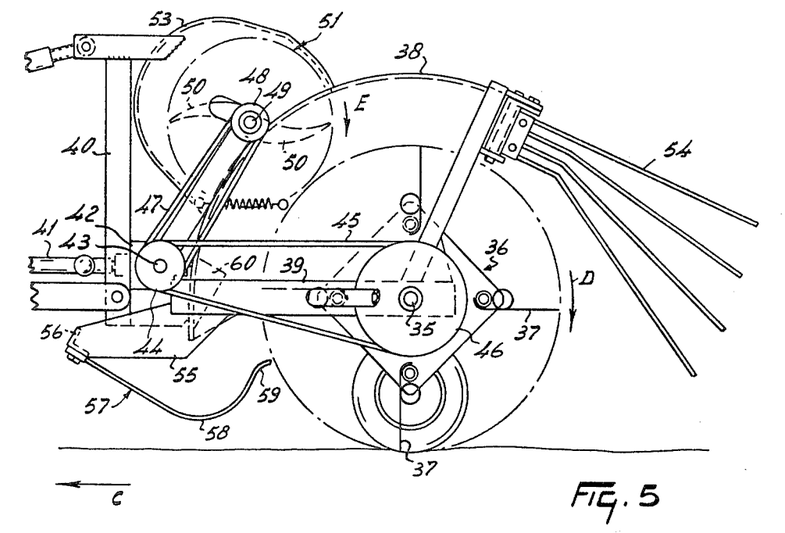
FIG. 5 is a side elevation as seen in the direction indicated by an arrow V in FIG. 4, FIGS. 6, 7 and 8 are all sectional side elevations as seen in the direction indicated by the arrow V in FIG. 4 but illustrate alternative embodiments.

FIGS. 4 and 5 of the drawings illustrate a machine for working mown crop which is lying upon the ground in the form of a drum tedder, the tedder comprising a crop conveyor in the form of a tined drum 36 that is rotatable about the substantially horizontal axis of a central shaft 35 of the drum, said shaft 35 itself being rotatable with the drum 36. The shaft 35 extends either perpendicular (as illustrated) or transverse to the intended direction of operative travel of the tedder which is again indicated by an arrow C. The drum is provided with a plurality, such as four, of rows of crop engaging members that are in the form of resilient tines 37, said rows extending, in a manner which is known per se, throughout the whole of the working width of the drum 36. The drum 36 is intended to be rotated in the direction that is indicated by an arrow D in FIG. 5 of the drawings which direction is such that the tines 37 move forwardly over the ground surface with respect to the direction C. An upper, and principally leading with respect to the direction C, region of the drum 36 is partially surrounded by a hood or baffle 38 with a curved wall which is of part-cylindrical formation, the center of curvature thereof coinciding or substantially coinciding, with the longitudinal axis of the shaft 35. The hood or baffle 38 also comprises substantially vertical end walls which are parallel or substantially parallel to one another and parallel or substantially parallel to the direction C. It will be noted from FIG. 5 of the drawings that the lower leading (with respect to the direction C) edge of the curved wall of the hood or baffle 38 is spaced from the ground surface by a distance which is a little less than is the spacing of the longitudinal axis of the shaft 35 from the ground surface, the curved wall of the hood or baffle 38 subtending an angle of substantially 120° about said axis. The drum 36 and the hood or baffle 38 are carried by a frame 39 of the tedder which frame 39 is of broad U-shaped configuration as seen in the plan view of FIG. 4 of the drawings, the base of the "U" being foremost with respect to the direction C with the two parallel limbs projecting substantially horizontally rearwards therefrom. Said base of the frame 39 is provided, midway across the width of the tedder with a coupling member or trestle 40 that is of substantially triangular configuration as seen in front or rear elevation. The coupling member or trestle 40 is constructed and arranged, in a manner that is known per se and that is illustrated somewhat diagrammatically in FIGS. 4 and 5 of the drawings, for connection to the three-point lifting device or hitch at the rear of an agricultural tractor or other operating vehicle.

A gear box 42 is fastened to the "base" of the frame 39 midway across the width of that base and has a rotary input shaft which projects forwardly from the front thereof in substantially the direction C, the forwardly projecting portion of the rotary input shaft being splined or otherwise keyed to enable it to be placed in driven connection with the rear power take-off shaft of the agricultural tractor or other operating vehicle of the tedder through the intermediary of a telescopic transmission shaft 41, which is of a construction that is known per se, having universal joints at its opposite ends. A substantially horizontal output shaft 43 of the gear box 42 extends parallel to the shaft 35, inside a protective casing, to one side of the tedder where it is provided with a multiple pulley 44. At least two V-belts 45 or the like place the multiple pulley 44 in driving connection with a larger multiple pulley 46 that is fastened to the corresponding end of the shaft 35, the drum 36 thus being drivable from the gear box 42. At least one V-belt or the like 47 places the multiple pulley 44 in driving connection with a smaller single or multiple pulley 48 which latter is fastened to one end of a substantially horizontal shaft 49 that is parallel to the shaft 35 and that extends throughout substantially the whole of the working width of the drum 36. As seen in side elevation (FIG. 5), the shaft 49 is located just outside the hood or baffle 38, that is to say, just beyond the convex surface of the curved wall thereof. A plane which contains the longitudinal axes of the two shafts 35 and 49 is inclined to both the horizontal and the vertical at substantially 45° and extends obliquely upwardly and forwardly, with respect to the direction C, from the ground surface.

The shaft 49 is provided at regular intervals along its length with a plurality (for example, nine) of groups of tines 50 which are made from plates. In the embodiment which is being described, each group comprises two tines 50 that are at diametrically opposite sides of the shaft 49, each tine 50 being of curved configuration. The general plane of each plate-formation tine 50 is substantially vertically disposed in perpendicular relationship with the longitudinal axis of the shaft 49 to which it is secured. The rotary shaft 49 and the groups of symmetrically opposed tines 50 together afford a crop restraining member that is generally indicated by the reference 51, the member 51 being rotated, during the use of the tedder, from the multiple pulley 44 in the direction that is indicated by an arrow E in FIG. 5 of the drawings which direction, it will be noted, is the same as the direction of rotation D of the drum 36. FIG. 5 of the drawings shows, in broken lines, skeletal cylindrically curved figures that are traced by the tips of the tines 37 and 50 during rotation of the drum 36 and crop restraining member 51, respectively. It will be seen that these figures so closely approach one another as nearly to touch but it is particularly noted that this arrangement is not essential and that, if preferred, said figures may overlap to some extent in which case the tines 50 pass through the gaps between the tines 37 and vice versa. The curved wall of the hood or baffle 38 is formed with a number of slots 52 that is equal to the number of groups of tines 50 that are provided, each slot 52 being in register with one of said groups. Thus, when the crop restraining member 51 is in rotation, each of its tines 50 moves alternately inside (i.e. beneath) and outside (i.e. above) the curved wall of the hood or baffle 38. The slots 52 are narrow in a direction that is parallel to the longitudinal axes of the shafts 35 and 49 and the opposite edges thereof accordingly afford scraping members for shedding crop from the tines 50 that move between them during the use of the tedder. The slots 52 are of oblong configuration as seen in plan view (FIG. 4) and each of them may be provided, at the convex side of the curved wall of the hood or baffle 38, with a corresponding second hood or baffle 53 whereby, during operation of the tedder, each tine 50 is enclosed within the second hood or baffle 53 that is individual to the corresponding group of tines 50 during movement of the tine 50 under consideration above the convex surface of the curved wall of the first hood or baffle 38. As a further alternative, the individual second hoods or baffles 53 may be combined to form a single second hood or baffle 53 that co-operates with all of the groups of tines 50. It is however, emphasized that the provision of the or each second hood or baffle is not essential but can be useful under certain operating conditions.

The top and rear, with respect to the direction C, edge of the curved wall of the hood or baffle 38 is provided with two co-operating pairs of crop guide members 54, each guide member 54 being in the form of an assembly of resilient guide rods that is angularly adjustable about a corresponding obliquely upwardly extending axis. When the crop guide members 54 are arranged as shown in FIG. 4 of the drawings, the hay or other crop that is displaced by the tined drum 36 will be formed by said members into two separate swaths or windrows but, if desired, the two center members 54 may be removed in which case the remaining two members 54 will form the displaced hay or other crop into a single board swath or windrow. When the drum tedder is required merely to spread the displaced hay or other crop over the ground without forming it into a swath or windrow, the guide members 54 are either removed or may be arranged so as to be capable of being tilted into positions in which they will not influence the hay or other crop that is delivered rearwardly by the tined drum 36.

The leading "base" of the broad U-shaped frame 39 is provided, at its opposite ends, with two downwardly and forwardly projecting support plates 55, the leading extremities of which are rigidly interconnected by a carrier bar 56 of L-shaped cross-section. The carrier bar 56 is parallel to the shafts 35 and 49 and extends throughout the whole of the working width of the drum 36. A large number (purely for example, eighteen) of crop restraining guides 57 are releasably fastened to the carrier bar 56 by bolts and clamping plates at regular intervals along the length of that bar 56. As illustrated, each crop restraining guide 57 is in the form of a spring steel strip but spring steel or other resilient rods of circular or substantially circular cross-section could equally well be employed as an alternative. Each crop restraining guide 57 initially extends obliquely downwardly and rearwardly, with respect to the direction C, from the carrier bar 56 in a substantially rectilinear manner and then merges into an arcuately curved portion 58 with a convex side which faces downwardly towards the ground surface at a small distance from that surface. At the end of the curved portion 58 of each guide 57 which is remote from the bar 56, said guide is inclined upwardly and rearwardly (with respect to the direction C) to the horizontal at an angle of substantially 45°. Each crop restraining guide 57 terminates in a rear end portion 59 which preferably (as illustrated) but not essentially is curved in the opposite direction to the adjoining portion 58. The rearmost extremities of the portions 59 are very close to the cylindrically curved surface which is shown in broken lines in FIGS. 4 and 5 of the drawings and which is traced by the tips of the tines 37 of the drum 36 during operative rotation of that drum in the direction D. However, once again, the arrangement may be such that the rear end portions 59 of the crop restraining guides 57 penetrate inwardly of the cylindrical figure in which case the strips or rods that afford the guides 57 register with the spaces between the tines 37 in the rows thereof that are carried by the drum 36. If desired, the support plates 55 may be replaced by a dual parallelogram linkage that is basically similar to the parallelogram linkage that has been described above with reference to FIGS. 1 to 3 of the drawings. This enables the carrier bar 56 and crop restraining guides 57 to move upwardly and downwardly, without tilting, to match the thicknesses of different layers of crop that the drum tedder may have to deal with.

In the use of the drum tedder that has been described with reference to FIGS. 4 and 5 of the drawings, its coupling member or trestle 40 is connected to the three-point lifting device or hitch at the rear of an agricultural tractor or other operating vehicle and the drive transmission to the shafts 35 and 49 is placed in driven connection with the rear power take-off shaft of the same tractor or other operating vehicle by way of the known intermediate telescopic transmission shaft 41 that has universal joints at its opposite ends. As the drum tedder moves operatively in the direction C over hay or other mown crop which is lying upon the ground, that crop is first engaged by the row of crop restraining guides 57 and is pressed downwardly into engagement with the ground surface principally by the arcuately curved portions 58 of those guides 57. The hay or other crop, which is restrained from any substantial movement relative to the ground surface by the guides 57, is picked up by the crop engaging tines 37 of the advancing drum 36, said tines 37 progressively entraining the hay or other crop with a carding, combing and/or teasing action that is particularly effective in disentangling any already knotted or balled crop. The hay or other crop that is picked up by the tines 37 is moved upwardly and forwardly in the direction D around the axis of the shaft 35 beneath the hood or baffle 38, most of it being located between the cylindrically curved figure that is shown in broken lines in FIGS. 4 and 5 of the drawings and the concave surface of the curved wall of the hood or baffle 38. Crop which is already disentangled passes without difficulty between the rotating tines 50 of the crop restraining member 51 but insufficiently disentangled accumulations of crop are operatively engaged by the rotating tines 50 and are subjected to a further carding, combing and/or teasing action. It will be remembered that, in the region of close proximity or overlap of the drum 36 and the crop restraining member 51, the tines 50 of the latter move in the opposite direction to the tines 37 of the former. The member 51 restrains progress of entangled hay or other crop in the direction D until its tines 50 have disentangled and straightened the stalks of that crop to allow it to be moved onwardly in the direction D by the tines 37. The scraping members that are afforded by the edges of the slots 52 prevent significant quantities of hay or other crop form being rotated with the tines 50 and it will be remembered that said tines 50 are curved outwardly and rearwardly from the shaft 49 with respect to the direction E so that any adhering crop tends to be shed therefrom when the drum tedder is in use. The hay or other crop which passes in the direction D beyond the crop restraining member 51 is in a principally straightened and separated condition in which no large crop entanglements remain and said crop is either guided into one or two swaths by the members 54 or, when those members 54 are removed or rendered inoperative, is spread substantially uniformly over the ground surface with a tedding action.

In addition to the carding, combing and/or teasing action that is produced by the co-operation of the rotary crop engaging tines 37 with the crop restraining guides 57 and the crop restraining tines 50, a row of crop restraining tines 60 of substantially triangular plate formation may be provided on the concave surface of the curved wall of the hood or baffle 38 at a location just above the lower leading edge of that wall. The tines 60 of said row are regularly spaced apart from one another in a direction that is parallel to the shafts 35 and 49. The tines 60 will tend to restrain any crop entanglements that have not already been sufficiently dealt with by the crop guides 57 and co-operating rotary tines 37 from further progress in the direction D, said tines 37 performing a carding, combing and/or teasing action upon such restrained crop accumulations until they are sufficiently small to escape from the tines 60 and move ownwardly in the direction D for a final disentangling treatment by the tines 50 of the crop restraining member 51 in co-operation with the tines 37 of the rotary crop conveyor drum 36.

Figure 6:
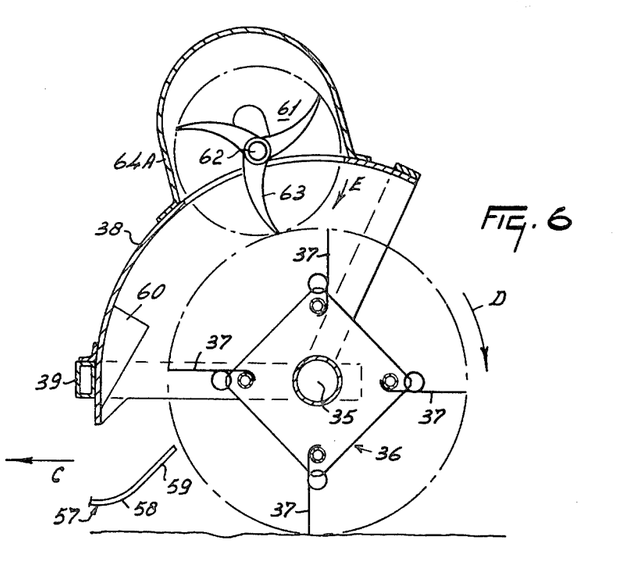

The crop restraining members that are afforded by the guides 57 and plate formation tines 60 naturally have a retarding effect upon the flow of the picked up hay or other crop in the direction D and, under some circumstances, it is preferable that the final crop restraining member should be close to the upper rear edge of the curved wall of the hood or baffle 38 where the displaced hay or other crop is moving at its maximum displacement speed which will be at least approaching the speed of rotation of the drum 36 in the direction D. Such a construction is illustrated in FIG. 6 of the drawings in which parts that are similar, or identical, to parts that have already been described are designated by the same reference numerals as have been used in FIGS. 4 and 5 of the drawings. It is noted that, in the embodiment of the drum tedder that is shown in FIG. 6 of the drawings, the rear end portions 59 of the crop guides 57 are substantially straight instead of being curved as in the embodiment of FIGS. 4 and 5. Both the crop guides 57 and the crop restraining plate formation tines 60 are shown with their extremities spaced from the cylindrical figure that is traced by the tips of the tines 37 of the drum 36 during rotation of that drum but it is possible for either or both of the crop guides 57 and tines 60 to be so arranged that their extremities penetrate inwardly of said figure to some extent so as to register with the spaces between the tines 37. In the embodiment of FIG. 6 of the drawings, the crop restraining member 51 is replaced by an alternative crop restraining member 61 that is disposed, as discussed above, quite close to the upper rear edge of the hood or baffle 38. The crop restraining member 61 has a central rotary shaft 62 that extends parallel to the central shaft 35 of the drum 36 throughout the working width of that drum. The shaft 62 is driven in the same way as is the shaft 49 in the embodiment of FIGS. 4 and 5 of the drawings. However, the shaft 62 carries a plurality of groups of curved plate formation tines 63, each group comprising three of said tines 63 that are angularly spaced apart from one another at 120° intervals around the longitudinal axis of the shaft 62. Once again, the shaft 62 is disposed just outside the hood or baffle 38 (i.e. just above the convex surface of its curved wall) and the tines 63 accordingly move successively inside and outside said baffle 38 through slots which are equivalent to the slots 52 except as regards their positions, the opposed edges of said slots thus again serving as scraping members to shed temporarily adhering hay or other crop from the tines 63. The tines 63 are curved rearwardly with respect to their intended direction of operative rotation E in substantially the same manner as are the previously described tines 50. A single second hood or baffle 64A may be provided above the hood or baffle 38 to enclose the crop restraining member 61 or a number of individual second hoods or baffles 64A may be provided, one for each group of the tines 63. However, as in the embodiment of FIGS. 4 and 5 of the drawings, the single second hood or baffle 64A or multiple second hoods or baffles 64A are by no means essential but can be useful under certain operating conditions.

Figure 7:
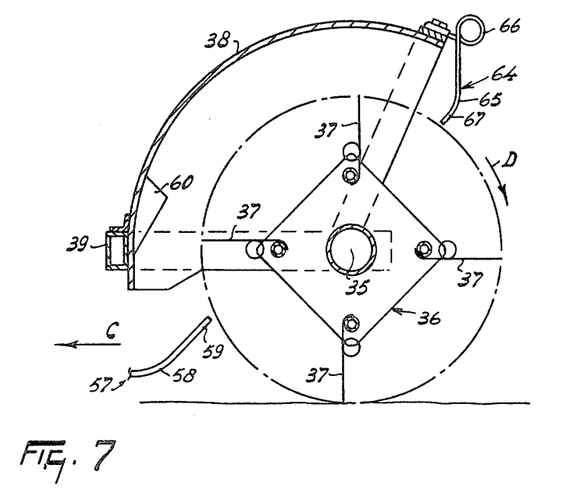

FIG. 7 of the drawings illustrates an embodiment in which the crop guides 57 and plate formation tines 60 are provided but in which there is no crop restraining member equivalent to either the crop restraining member 51 or the crop restraining member 61, a crop restraining member 64 of an alternative construction being provided immediately beyond, in the direction D, the rear edge of the curved wall of the hood or baffle 38. The crop restraining member 64 comprises a row of spring steel or other resilient tines 65 that extends parallel to the longitudinal axis of the shaft 35. The crop working portion of each tine 65 is connected to the hood or baffle 38 by a bolt and clamping plate through the intermediary of a corresponding helical coil 66 which, it will be noted, is at a radial distance from the shaft 35 which is greater than the distance therefrom of the curved wall of the hood or baffle 38. Said crop working portion of each tine 65 extends substantially vertically downwards from the corresponding coil 66 towards the tined drum 36 but has a lower end portion 67 that is bent forwardly to some extent with respect to the direction C so as to be disposed substantially radially with respect to the longitudinal axis of the shaft 35. The extremities of the lower end portions 67 of the tines 65 are shown in FIG. 7 of the drawings as being in very close proximity to the cylindrically curved figure that is traced by the tips of the tines 37 during rotation of the drum 36 but said tines 65 may be so arranged that their lower end portions 67 project short distances inwardly of said figure into the spaces that are left between the tines 37 in the rows of those tines.

In the use of the drum tedder of FIG. 7 of the drawings, the crop guides 57 and plate formation tines 60 act in substantially the same manner as has already been discribed above so that, by the time that the hay or other crop reaches the restraining member 64 in its progress in the direction D, and initial large crop entanglements will have been broken up and, under most circumstances, most of the crop will already have been disentangled and straightened to produce a crop flow in which a majority of the stalks are separate from their fellows and are not entangled therewith. Such straightened and disentangled crop will pass easily in the direction D between the tines 65 of the member 64 but the remaining, usually quite small, accumulations of entangled crop that reach the member 64, moving at substantially the maximum speed in the direction D which they attain, will be restrained from further progress in said direction by the tines 65 of the member 64. Such entangled accumulations of crop tend to slide down the tines 65 towards the drum 36 and are therefore continually subject to the carding, combing and/or teasing action of the rotating crop engaging tines 37. These crop accumulations are therefore disentangled and straightened quite quickly and are deposited on the ground behind the drum tedder in a diffuse condition with the hay or other crop that was already sufficiently disentangled or that was not initially in an entangled state or both.

Figure 8:
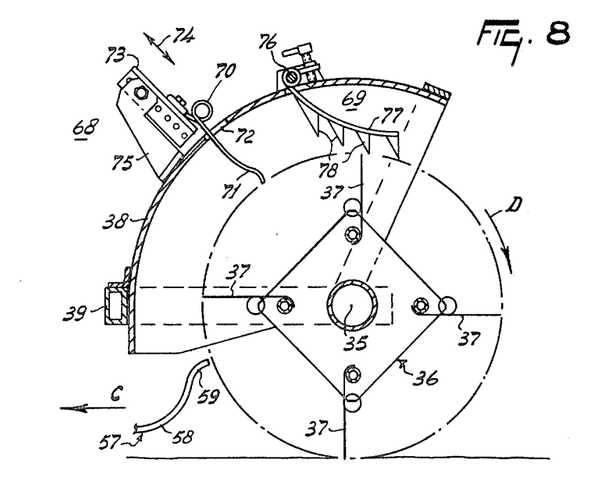

In the embodiment of FIG. 8 of the drawings, the crop restraining guides 57 are employed but the crop restraining plate formation tines 60 and the other crop restraining members that have been described above are omitted and are replaced by two separate crop restraining members that are indicated by the references 68 and 69, respectively. The crop restraining member 68 which, following the guides 57, is the first to be encountered by picked up hay or other crop in its progress in the direction D beneath the hood or baffle 38, is of substantially radially (with respect to the shaft 35) displaceable formation. The member 68 comprises a row of spring steel or other resilient tines 71 that are spaced apart from one another at regular intervals throughout the working width of the drum 36 and in a direction that is parallel or substanitally parallel to the longitudinal axis of the shaft 35. Each tine 71 has a crop working portion that projects through a corresponding narrow slot 72 in the hood or baffle 38, said crop working portion being connected by a corresponding resilient coil 70 to a fastening portion which is releasably secured to a plate 73 by a bolt and a clamping member. It will be noted that the coils 70 lie at the convex side of the curved wall of the hood or baffle 38 and that the narrow slots 72 are of sufficient length to accomodate resilient deflections of the crop working portions of the tines 71 that have considerable angular magnitudes. The plate 73 to which the tines 71 are releasably secured is provided at or near its ends with perpendicularly bent portions in which rows of holes are formed. Brackets 75 are secured to the convex surface of the curved wall of the hood or baffle 38 and include aperatured portions that register with the bent portions of said plate 73. Bolts are provided for entry through the holes in the brackets 75 and chosen ones of the holes in the bent-over portions of the plate 73 and it will be readily apparent from a study of FIG. 8 of the drawings that, upon temporarily removing said bolts, the plate 73 and the tines 71 which it carries can be moved either substantially radially inwardly or substantially radially outwardly as indicated by arrows 74. Once an appropriate new setting of the retaining member 68 has been established, the bolts are replaced and tightened so as to maintain that setting as long as may be required. The member 68 may be arranged in a position such as that which is shown in FIG. 8 of the drawings in which the slightly curved free ends of the crop working portions of its tines 71 have their extremities substantially coinciding with the cylindrically curved figure that is traced by the tips of the tines 37 of the crop conveying drum 36 when the drum tedder is in operation. Adjustment in the manner which has just been described enables the extremities of the tines 71 to be spaced from the cylindrically curved figure or to penetrate radially inwardly thereof. In the latter circumstances, the tines 71 penetrate into the spaces between the tines 37 in the four rows of the latter. Both the crop working portions of the tines 71 and the plate 73 are contained in planes which also contain the longitudinal axis of the shaft 35, both of said planes, which are nearly coincident, being inclined upwardly and forwardly, with respect to the direction C, from the ground surface at an angle of substantially 45° to both the horizontal and the vertical.

The crop restraining member 69 is located substantially vertically above the central shaft 35 of the drum 36 and is freely pivotable in an upward direction about the substantially horizontal axis of a shaft 76 which extends parallel to the shaft 35 at a location immediately above the convex surface of the curved wall of the hood or baffle 38. Downward pivotability of the member 69 is limited in an adjustable manner, for example by employing screwthreaded set bolts of the kind that are shown in FIG. 8 of the drawings. It will be apparent that the set bolt which can be seen in FIG. 8 of the drawings is adjustable axially in a screw-threaded bracket and that the chosen position of downward extension thereof from that bracket dictates how far a row of curved rods 77 can turn downwardly in a clockwise direction (as seen in FIG. 8) about the longitudinal axis of the shaft 76. The row of rods 77 extends throughout the working width of the drum 76 in a direction parallel to the longitudinal axis of the shaft 35 and said rods 77, which are arcuately curved in the opposite direction to the curved wall of the hood or baffle 38, may be turnable individually, or in groups, or in common about the axis of the shaft 76. Each rod 77 projects through a narrow slot in the curved wall of the hood or baffle 38 and, when the drum tedder is not in use, gravity maintains the rods 77 in their positions of maximum angular displacement about the axis of the shaft 76 in a clockwise direction as seen in FIG. 8. The curved arrangement of the rods 77 is such that they extends downwardly and rearwardly with respect to the direction C from the shaft 76 to locations beneath the hood or baffle 38. The downwardly directed convex side of each rod 77 carries a plurality, such as four, of generally triangular teeth or tines 78 which lie one behind the other in the direction D and which are progressively closer to the cylindrical figure which is traced by the tips of the crop engaging tines 37 of the drum 36 when the tedder is in use, assuming that the rods 77 and teeth or tines 78 have not been displaced about the axis of the shaft 76 in a counter clockwise direction as seen in FIG. 8 of the drawings to any significant extent as compared with what can be seen in FIG. 8. The four, or other number, of teeth or tines 78 that correspond to each rod 77 are so shaped that their points are all directed downwardly towards the drum 36 but also forwardly to some extent with respect to the direction D. Each tooth or tine 78 is of substantially rigid metallic or other plate formation.

In the use of a drum tedder constructed in accordance with FIG. 8 of the drawings, the crop restraining guides 57 act in the manner which has already been described above by temporarily pressing mown hay or other crop into contact with the ground surface and allowing the crop engaging tines 37 of the crop conveying drum 36 to pick up that crop in such a way that a carding, combing and/or teasting action is performed thereon whereby any large knots or balls of entangled crop are at least partially broken up. The crop that is picked up by the tines 37 and moved in the direction D beneath the hood or baffle 38 next encounters the tines 71 of the crop restraining member 68. Crop that is already in a separate and straightened condition can pass quite easily between the tines 71 but remaining crop entanglements are restrained from further progress in the direction D thereby. The crop restraining member 68 will have been adjusted before work commenced, by moving the tines 71 radially inwardly or outwardly in the direction of one of the arrows 74 having regard to the nature and condition of the crop concerned, and particularly its density. The pre-adjusted tines 71 co-operate with the rotary tines 37 in further carding, combing and/or teasing the crop so that only any very large remaining accumulations of entangled crop can pass onwardly in the direction D without being substantially completely disentangled and straightened. Any such large accumulation of crop deflects some of the tines 71 in a counter-clockwise direction as seen in FIG. 8 of the drawings, the deflected tines 71 moving along the slots 72 until the accumulation concerned can escape in the direction D from therebeneath, such escape normally taking place before a serious blockage can occur. Any persistent and/or badly knotted or balled crop entanglements that pass beyond the member 68 are engaged by the substantially rigid rows of teeth or tines 78 of the member 69. Once again, the tines 37 of the drum 36 disengage crop from accumulations that are restrained by the teeth or tines 78 with a carding, combing and/or teasing action, the separated crop being discharged rearwardly with respect to the direction C, with other untangled crop, from beneath the rear edge of the curved wall of the hood or baffle 38. In the event of a serious blockage tending to occur in the region of the crop restraining member 69, the teeth or tines 78 and corresponding rods 77 which are affected can yield upwardly in a counter-clockwise direction as seen in FIG. 8 about the axis of the shaft 76 until the potential blockage has been cleared. It will be remembered that the positions of the rods 77, and thus of the teeth or tines 78, can be preset, before work commences, thereby to adjust the undeflected positions of the teeth or tines 78 relative to the cylindrical figure that is traced by the tips of the rotary crop engaging tines 37 of the crop conveying drum 36.

In all of the drum tedder embodiments that have been, described with reference to FIGS. 4 to 8 of the drawings, the crop engaging tines 37 of the crop conveying drum 36 co-operate with the various crop restraining members 51, 57, 60, 61, 64, 68 and 69 in such a way that the hay or other crop is deposited on the ground, after working, in a well separated and diffuse condition or is formed into at least one very uniformly constructed swath or windrow when crop guide members, such as the members 54 of FIGS. 4 and 5 of the drawings, are employed for that purpose. Even if the mown hay or other crop which is lying upon the ground is in a somewhat irregular condition as regards its layer thickness, the drum tedder tends to discharge that crop at a substantially uniform rate because of the restraining effect of the various crop restraining guides and other members that have been described. It will be apparent that, during a haymaking operation, some accumulations of crop will almost always be in engagement with the various crop restraining members and will be being progressively minimized in size by the carding, combing and/or teasing action of the rotary tines 37 so that, even if the drum tedder should momentarily not be picking up any hay or other crop from the ground, delivery of progressively disentangled crop will continue unless an exceptionally long gap in the initial crop engaging action of the tines 37 is involved. The hay or other crop is disentangled to such an extent that the natural drying thereof by sun and wind and its subsequent mechanical collection are greatly facilitated.

Although various features of the machine for working mown crop described and illustrated in the accompanying drawings will be set forth in the following claims as inventive features, it is emphasized that the invention is not necessarily limited to those features and may include within its scope each of the parts of each machine that has been described, or illustrated or both in the accompanying drawings, either individually or in various combinations.

Having described my invention, what I claim as new and desire to secure by Letters Patent of the United States is:

1. An agricultural machine for working cut crop lying on the ground, said machine comprising a rotating crop engaging means substantially tangent to the underlying ground having a horizontal axis of rotation transverse to the normal direction of travel of the machine in operation, a hood extending in part over said crop engaging means, means for receiving said crop from the ground and moving said crop to between said hood and said crop engaging means whereby said crop engaging means moves crop through the space between said hood and said crop engaging means and delivers same back onto the ground, crop restraining guides for guiding crop lying on the ground into said receiving means, said crop restraining guides being inclined first downwardly to the rear and then inclined upwardly under said hood, tines resiliently mounted on said hood with free ends spaced closely proximate the outermost cylindrical path of rotation described by said crop engaging means and directed towards the axis of rotation of said crop engaging means for engaging and combing crop moving between said hood and said crop engaging means whereby said crop is returned from the machine to the ground in a combed condition.

2. A machine for working cut crop which comprises means for receiving cut crop lying on the ground and means for delivering said crop back on the ground after working same, at least one group of resilient tines which extends throughout not less than one-half of the working width of the machine at a location between said receiving and delivery means, and two side-by-side rotating crop engaging means which are rotatable about upwardly directed axes in opposite directions whereby crop is moved between them relatively rearwardly with respect to the machine's operative direction of travel, said group of resilient tines occupying substantially an unchanging operative relationship to said axes of rotation of said crop engaging means and extending substantially radially inwardly towards a corresponding said axis of rotation as seen in plan, the outer ends of said tines each extending so at least to be spaced closely to the paths of said crop engaging means and arranged to co-operate with said crop engaging means during use of the machine whereby a carding, combing and/or teasing action is performed upon crop moved through the machine by said crop engaging means.

3. A machine as claimed in claim 2 wherein there are crop guides forward of said tines disposed throughout not not less than one-half of the machine's working width and substantially parallel to the ground and extending rearwardly during the use of the machine whereby crop is pressed against the surface of the ground by said crop guides prior to said carding, combing and/or teasing action.

4. A machine as claimed in claim 2, wherein said group of resilient tines is arranged selectively to occupy either operative crop guiding positions or inoperative positions in which they do not influence the direction of delivery of displaced crop.

5. A machine as claimed in claim 2, which includes means for providing movement of said group of resilient tines upwardly and downwardly relative to said crop engaging means.

6. A machine as claimed in claim 5, wherein said means for providing movement of said group of resilient tines includes means responsive to crop lying on the ground thereunder.

7. A machine as claimed in claim 6, wherein said responsive means comprise crop guides which are resilient and engage crop on the underlying ground.

8. A machine for working cut crop which comprises rotating raking means which rotates about a substantially vertical axis for conveying said crop along the surface of the ground wherein throughout not less than one-half of the working width of the machine, relatively stationary tines are provided as seen in plan which project radially inwardly towards the axis of rotation of said crop conveying means, free ends of said tines extending closely proximate to a figure traced by movement of said crop conveying means.

9. A machine as claimed in claim 8, wherein a crop guide member is provided forwardly relative to the remainder of the machine when the latter is in use.

10. A machine as claimed in claim 9, wherein said crop guide member is arranged to press downwardly mown crop lying on the ground when the machine is in use.

11. A machine as claimed in claim 8, wherein a crop guide means is provided with further tines that extend towards said axis of rotation forward of said first mentioned tines.

12. A machine as claimed in claim 11, wherein free ends of said further tines are arranged to extend substantially parallel to the ground at a level lower than said first mentioned tines.

13. A machine as claimed in claim 9, wherein said tines comprise a row of guides extending substantially to the rearward with respect to the intended direction of operative travel of the machine from fastening portions thereof, at least portions of said guides being directed downwardly.

14. A machine as claimed in claim 13, wherein said row of guides is arranged to co-operate with the mown crop lying upon the ground surface when the machine is in use.

15. A machine for working cut crop which comprises a receiving means, relatively stationary crop guide means for pressing cut crop to the ground before entering said receiving means, rotary moving means for moving said crop from said guide means through the machine having a horizontal axis of rotation transverse to the usual operational direction of the machine's travel and rotating rearwardly as seen in plan, said guide means extending closely proximate the path of rotation of said moving means, a delivery means, at least one continuously rotating rearwardly as seen in plan relatively non-resilient tine means having its outermost tip moving at least very close to said rotary moving means which performs the function of retarding displacement of at least entangled crop being moved by said moving means from said receiving means to said delivery means during operation of the machine, only part of said rotatable tine means extending into the region of crop movement between said guide means and said delivery means, the remaining part of said rotatable tine means extending outwardly of said region, drive means connected to said rotatable tine means for causing said rotatable tine means to rotate and at least one crop-shedding scraping member being provided which cooperates with said rotary tine means.

16. A machine as claimed in claim 14 including a baffle for said tine means wherein said crop-shedding scraping member comprises the opposite edges of a slot in said baffle through which said tine means are movable.

17. A machine as claimed in claim 16, wherein said baffle partially surrounds said rotary moving means, a rotary drum being provided from which rotary said moving means extend.

18. A machine as claimed in claim 17, wherein said tine means is arranged closely downstream of said receiving mean with respect to the intended direction of operative displacement of crop through the machine.

19. A machine for working cut crop which comprises a pair of side-by-side rotating conveying means for moving cut crop having vertical axes of rotation, a group of guide means mounted on a pair of arcuately curved supports concentric with respective said axes which are relatively stationary as seen in plan extending across not less than one-half of the working width of the machine, said group of guide means being in engagement with the ground surface or with mown crop which is lying on that surface when the machine is in use at a location which is in advance of said crop conveying means with respect to the intended direction of operative travel of the machine, said guide means each extending in a substantially normal relationship from said supports and at least closely proximate relative to a path traced by the operative movement of said crop conveying means, said group of guide means comprising a plurality of guidance tines each of which extends substantially horizontally at its outward tip and towards the axis of rotation of at least one of said conveying means.

20. An implement as claimed in claim 17, wherein said guidance tines are located in advance of said crop conveying means with respect to the intended direction of operative travel of the machine.

21. A machine for working cut crop which comprises means for receiving cut crop lying on the ground and means for delivering said cut crop back onto the ground after working same, at least one group of tines which extends throughout not less than one-half of the working width of the machine in a location between said receiving and said delivery means, and a rotating crop engaging means which rotates about a horizontal axis transverse to the machine's operational direction of travel, said tines of said group of tines being composed of rigid material and being freely pivotally supported relative to said crop engaging means whereby the outer ends of said tines extend so that they at least are spaced closely to the path of said crop engaging means and thereby cooperate with said crop engaging means during use of the machine whereby they perform through their downward weight a carding, combing and/or teasing action upon the crop moved through the machine by said crop engaging means.

22. A machine as claimed in claim 17, wherein each said guide means is bodily displaceable relative to said crop conveying means.

23. A machine as claimed in claim 22, wherein a mounting for each said guide means is provided whereby it is mounted to be freely displaceable without tilting.

24. A machine as claimed in claim 23, wherein the machine includes a frame and said mounting comprises a parallelogram linkage by which each said guide means is coupled to said frame.

25. A machine as claimed in claim 24, wherein each said guide means is disposed in advance of its pivotal connection to said frame in relation to the intended direction of operative travel of the machine.

26. A machine as claimed in claim 24, wherein means is provided by which each said guide means is adapted to be retained in a selected one of a plurality of different positions relative to said mounting.

27. A machine as claimed in claim 26, wherein said each guide means is adjustable in a plurality of positions, within limits, relative to said mounting.

28. A machine for working cut crop which comprises means for receiving cut crop lying on the ground and means for delivering said crop back on the ground after working same, at least one group of resilient crop guides which extends throughout not less than one-half of the working width of the machine at said receiving means, and two side-by-side rotating crop engaging means which are rotatable about upwardly directed axes in opposite directions whereby crop is moved between them relatively rearwardly with respect to the machine's operative direction of travel, said group of crop guides disposed forward of said rotating crop engaging means, said crop guides being substantially parallel to the ground at their free ends and directed rearwardly, mounting means for said group of crop guides providing movement of said group upwardly and downwardly relative to said crop engaging means, said movement being responsive to crop lying on the ground which is engaged by said guide means during use of the machine.

* * * * *